(12) United States Patent
Nakamura et al.

(10) Patent No.: US 10,900,462 B2
(45) Date of Patent: Jan. 26, 2021

(54) GUIDE VANE APPARATUS FOR WATER TURBINE AND WATER TURBINE EQUIPPED WITH THE SAME

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Kazuyuki Nakamura, Yokohama Kanagawa (JP); Koichi Kubo, Kawasaki Kanagawa (JP); Takahiro Nakashima, Yokohama Kanagawa (JP); Takanori Nakamura, Yokohama Kanagawa (JP); Takuya Tomioka, Kawasaki Kanagawa (JP); Keita Saito, Kawasaki Kanagawa (JP)

(73) Assignees: Kabushiki Kaisha Toshiba, Tokyo (JP); Toshiba Energy Systems & Solutions Corporation, Kawasaki (JP)

(*) Notice: Subject to any disclaimer, the term of this patent is extended or adjusted under 35 U.S.C. 154(b) by 34 days.

(21) Appl. No.: 15/958,389

(22) Filed: Apr. 20, 2018

(65) Prior Publication Data
US 2018/0313320 A1 Nov. 1, 2018

(30) Foreign Application Priority Data

Apr. 20, 2017 (JP) ................................. 2017-083935

(51) Int. Cl.
*F03B 3/12* (2006.01)
*F03B 3/18* (2006.01)

(52) U.S. Cl.
CPC .............. *F03B 3/183* (2013.01); *F03B 3/125* (2013.01); *Y02E 10/20* (2013.01)

(58) Field of Classification Search
CPC .................................. F03B 3/183; F03B 3/125
See application file for complete search history.

(56) References Cited

U.S. PATENT DOCUMENTS

| 1,607,773 A | 11/1926 | Moody | |
|---|---|---|---|
| 3,007,675 A * | 11/1961 | Suss ........................ | F03B 3/183 415/45 |
| 3,210,045 A * | 10/1965 | Lindquist ................ | F03B 3/183 415/164 |

(Continued)

FOREIGN PATENT DOCUMENTS

| DE | 199 50 228 A1 | 11/2000 |
|---|---|---|
| FR | 1.241.019 A | 9/1960 |

(Continued)

*Primary Examiner* — Aaron R Eastman
*Assistant Examiner* — Theodore C Ribadeneyra
(74) *Attorney, Agent, or Firm* — Finnegan, Henderson, Farabow, Garrett & Dunner, L.L.P.

(57) ABSTRACT

According to the embodiment of the present invention, a guide vane of a water turbine rotatable about an axis, including a guide vane for directing supplied flowing water toward the downstream side. The guide vane has a downstream end edge having an upper end portion and a lower end portion. The lower end portion of the downstream end edge is displaced in the direction orthogonal to an axis with respect to the upper end portion of the downstream end edge when viewed from the downstream side.

10 Claims, 8 Drawing Sheets

(56) References Cited

U.S. PATENT DOCUMENTS

| | | | | |
|---|---|---|---|---|
| 3,360,241 A | * | 12/1967 | Lindquist | F03B 3/183 415/160 |
| 3,512,899 A | * | 5/1970 | Lindquist | F03B 3/183 415/126 |
| 4,575,307 A | * | 3/1986 | Shinohara | F03B 3/183 415/150 |
| 5,441,384 A | * | 8/1995 | Gokhman | F03B 3/183 415/148 |
| 5,873,700 A | * | 2/1999 | Ichikawa | F01D 5/288 415/160 |
| 6,007,297 A | * | 12/1999 | Buchelt | F03B 3/06 415/148 |
| 6,334,757 B1 | * | 1/2002 | Iwano | F03B 3/06 415/161 |
| 2005/0186068 A1 | * | 8/2005 | Coulson | F03B 3/18 415/163 |
| 2010/0129201 A1 | * | 5/2010 | Mazzouji | F03B 1/04 415/116 |
| 2014/0186186 A1 | * | 7/2014 | Hyneck | F03B 3/02 416/197 R |
| 2014/0308119 A1 | * | 10/2014 | Harada | F03B 3/125 415/208.2 |
| 2014/0363280 A1 | * | 12/2014 | Lavigne | F03B 3/02 415/191 |
| 2016/0160834 A1 | * | 6/2016 | Ko | F03B 3/02 415/155 |
| 2017/0260958 A1 | * | 9/2017 | Narikawa | F03B 3/02 |
| 2017/0260959 A1 | * | 9/2017 | Popelka | F03B 3/06 |

FOREIGN PATENT DOCUMENTS

| | | |
|---|---|---|
| JP | S58-59972 U | 4/1983 |
| JP | H11-141449 A | 5/1999 |
| JP | 2003-90279 A | 3/2003 |
| JP | 2007-113554 A | 5/2007 |
| JP | 4187640 B2 | 11/2008 |
| JP | 2015-10569 A | 1/2015 |

* cited by examiner

GUIDE VANE APPARATUS FOR WATER TURBINE AND WATER TURBINE EQUIPPED WITH THE SAME

CROSS-REFERENCE TO RELATED APPLICATIONS

This application is based upon and claims the benefit of priority from Japanese Patent Application No. 2017-083935, filed Apr. 20, 2017; the entire contents of which are incorporated herein by reference.

FIELD

Embodiments of the present invention relate to a guide vane apparatus for a water turbine and a water turbine equipped with the guide vane apparatus.

BACKGROUND

Generally, in a Francis turbine, flowing water supplied to a runner that is rotatably driven is adjusted in flow rate by a plurality of guide vanes. Guide vanes 3 and runners 4 in a conventional Francis turbine are illustrated in FIGS. 10 and 11. As illustrated in these figures, each guide vane 3 has a downstream end edge 31, which extends parallel to the rotation axis of the runner 4.

As illustrated in FIGS. 10 and 11, the runner 4 has a plurality of runner blades 7 arranged at equal intervals in the circumferential direction. The lower end portion 73 of the upstream end edge 71 of each runner blade 7 is displaced in the circumferential direction of the runner 4 with respect to the upper end portion 72 thereof. In the present specification, the circumferential direction of the runner 4 is used to encompass both the rotation direction R of the runner 4 (for example, the rotation direction for power generation operation) and the opposite direction. In the examples indicated in FIGS. 10 and 11, each of the runner blades 7 is positioned such that the lower end portion 73 of the upstream end edge 71 thereof is displaced with respect to the upper end portion 72 at a position advanced in the rotation direction R of the runner 4 in the circumferential direction (the clockwise direction in FIG. 11). As a result, the upstream end edge 71 of the runner blade 7 is inclined with respect to the rotation axis of the runner 4.

Note that, it is known that in a Francis turbine 10 (including a Francis pump turbine), water pressure pulsation occurs due to blade row interference between stationary blades of the guide vane 3 and moving blades of the runner 4. This hydraulic pulsation can be problematic as it impairs the stability of power generation or causes damage to equipment.

This water pressure pulsation will be described with reference to FIGS. 12 and 13. FIG. 12 is a view for explaining the cause of the occurrence of hydraulic pulsation between the runner blade 7 and the guide vane 3. FIG. 13 is a view schematically indicating the whole pressure distribution of an imaginary cylindrical surface C between the runner 4 and the guide vane 3. Here, the imaginary cylindrical surface C is a cylindrical surface concentric with the runner 4 and having the same diameter.

As illustrated in FIG. 12, during operation of the Francis turbine 10, the flowing water rectified by the stay vanes 2 provided on the upstream side of the guide vanes 3 flows along the guide vanes 3 having a finite thickness. At this time, a back flow 8 is generated at the downstream end edge 31 of the guide vane 3.

Generally, it is known that internal fluid energy (total pressure) of the back flow 8 is low. Therefore, as illustrated in FIG. 13, a low pressure portion is generated on the imaginary cylindrical surface C in the region intersecting the back flow 8. This low pressure portion exists at the same number of locations as the number of guide vanes 3 along the circumferential direction of the imaginary cylindrical surface C. When the runner blades 7 rotating at high speed crosses these low pressure portions, a pressure suddenly fluctuates, and water pressure pulsation occurs.

Patent Literature 1: JP 2007-113554 A
Patent Literature 2: JP 11-141449 A
Patent Literature 3: JP 4187640 B2

SUMMARY OF THE INVENTION

The present invention is originated based on the above-described knowledge. That is, an object of the present invention is to provide a guide vane capable of enhancing the stability during operation of a water turbine by reducing hydraulic pulsation generated between a runner and a guide vane and further enabling to extend the life of equipment and to provide a water turbine provided with the guide vane.

According to the present embodiment, a guide vane apparatus for a water turbine that can be rotatable about an axis includes a guide vane configured to rectify supplied flowing water toward a downstream side, wherein the guide vane has a downstream end edge having an upper end portion and a lower end portion, and the lower end portion of the downstream end edge is displaced in a direction orthogonal to the axis with respect to the upper end portion of the downstream end edge when viewed from the downstream side.

Alternatively, according to the present embodiment, a water turbine includes: a runner that is rotationally driven; and a guide vane disposed on an outer peripheral side of the runner, wherein the runner has runner blades, the runner blade includes an upstream end edge having an upper end portion and a lower end portion, the lower end portion of the upstream end edge is displaced with respect to the upper end portion of the upstream end edge in one of two circumferential directions of the runner, the guide vane includes a downstream end edge having an upper end portion and a lower end portion, and the lower end portion is displaced with respect to the upper end portion in the other of two circumferential directions of the runner.

According to the present invention, since hydraulic pulsation generated between a runner and a guide vane is reduced, it is possible to provide a guide vane apparatus and a water turbine equipped with the guide vane apparatus, which can enhance the stability during operation of a water turbine and further improve the life of equipment.

BRIEF DESCRIPTION OF THE DRAWINGS

FIG. 5A is a view illustrating a state in which the lower end portion (end portion on the band side) of a runner blade crosses a back flow; FIG. 5B is a view illustrating a state in which the middle portion of a runner blade crosses a back flow; and FIG. 5C is a view illustrating a state in which the upper end portion (end portion on the crown side) of a runner blade crosses a back flow;

DETAILED DESCRIPTION

Prior to describing each embodiment according to the present invention, the entire configuration of a general Francis turbine 10 will be schematically described.

Figure 9:
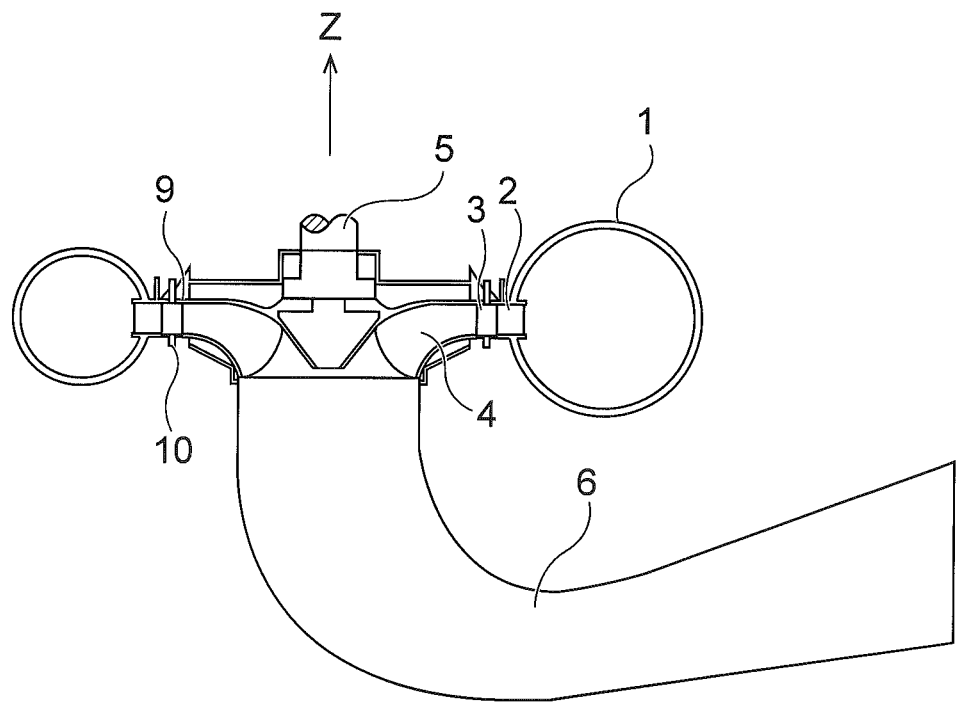
FIG. 9 is a schematic longitudinal sectional view illustrating a device configuration of a Francis turbine.

FIG. 9 is a schematic longitudinal sectional view indicating the entire configuration of the Francis turbine 10. As illustrated in FIG. 9, the Francis turbine 10 includes the runner 4, a stay vane 2, the guide vane 3, and a suction pipe 6. The stay vane 2 is disposed on the outer circumference side of the runner 4 and rectifies water flowing into the runner 4 via a hydraulic iron tube (not illustrated) and a spiral casing 1. The guide vane 3 adjusts the flow rate of the flowing water between the stay vane 2 and the runner 4. The suction pipe 6 flows out the flowing water having passed through the runner 4. The runner 4 includes a crown, a band, and a plurality of runner blades 7. The crown is connected to a main shaft (rotating shaft) 5. The band is disposed so as to face the crown. The runner blades 7 are provided between the crown and the band.

In such the Francis turbine 10, flowing water supplied from an upper pond through a hydraulic iron pipe is guided to the runner 4 by the stay vane 2 and the guide vane 3, the pressure energy of the flowing water is converted into rotational energy in the runner 4, and the main shaft 5 is rotated. As a result, the generator (not illustrated) coupled to the main shaft 5 is rotationally driven, and power generation is performed.

In the following description, the following explanation will be made assuming that, as illustrated in FIG. 9, the Z axis is taken so as to coincide with the rotation axis of the runner 4, and the Z axis direction is taken as the height direction. That is, the crown side positioned on the Z axis positive side will be referred to as the upper side, and the band side located on the Z axis negative side will be referred to as the lower side. Further, the rotation direction of the runner 4 is denoted by R. As indicated by arrows in FIGS. 10 and 11, the rotation direction R is a clockwise direction as viewed from above. Such a coordinate axis and the rotation direction R are defined in the same direction also in the other drawings (refer to FIGS. 1 to 5).

Although not illustrated, a spindle having a rotation axis parallel to the Z axis is integrally provided on each guide vane 3, and by rotation of the spindle, each guide vane 3 is rotated such that it can be rotated as desired around the rotation axis.

Next, a first embodiment of the present invention will be described in detail with reference to the accompanying drawings.

Figure 1:
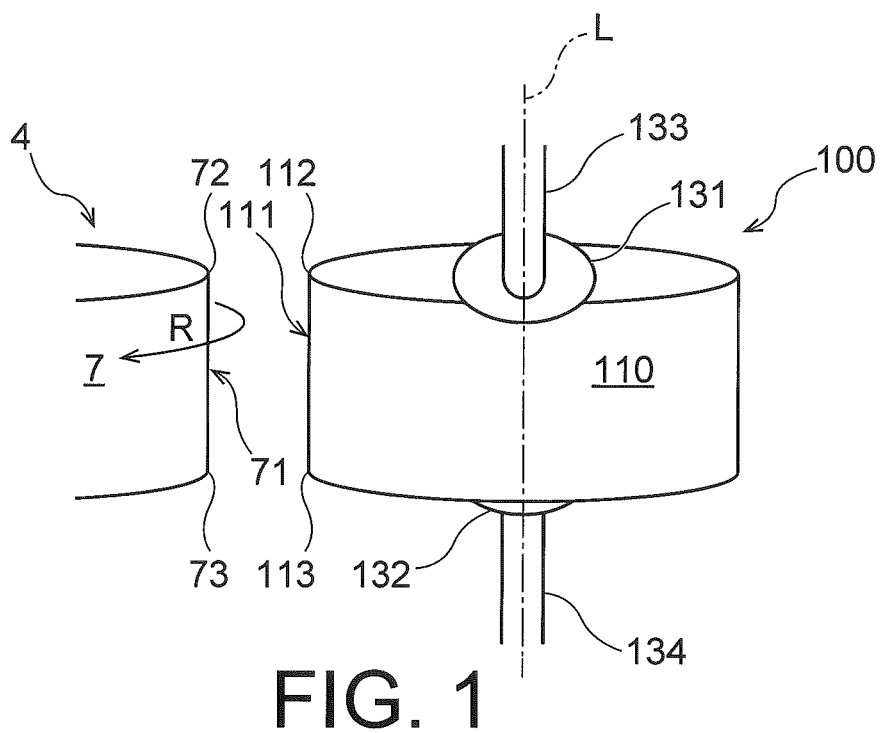
FIG. 1 is a schematic side view illustrating a guide vane apparatus according to a first embodiment of the present invention.
Figure 2:
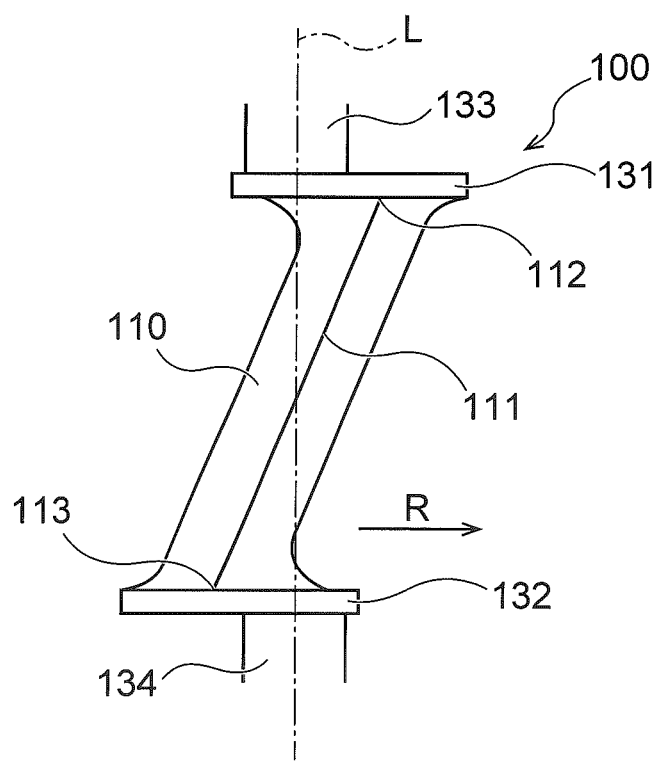
FIG. 2 is a schematic rear view of FIG. 1.

FIG. 1 is a schematic side view illustrating a guide vane apparatus 100 according to the first embodiment of the present invention, and FIG. 2 is a schematic rear view of FIG. 1.

As illustrated in FIGS. 1 and 2, the guide vane apparatus 100 according to the present embodiment is rotatable around an axis L parallel to the Z axis and provided with the guide vane 110 which directs the supplied flowing water to the downstream side (the left side in FIG. 1). As illustrated in FIGS. 1 and 2, the guide vane 110 has a downstream end edge 111 having an upper end portion 112 and a lower end portion 113. As illustrated in FIG. 2, the lower end portion 113 of the downstream end edge 111 is displaced in a direction orthogonal to the axis L with respect to the upper end portion 112 of the downstream end edge 111 as viewed from the downstream side (the front side in FIG. 2).

In particular, in the example indicated in FIG. 2, the lower end portion 113 of the downstream end edge 111 is displaced to the left side of the upper end portion 112 of the downstream end edge 111 as viewed from the downstream side (the opposite direction to the rotation direction R of the runner 4). The downstream end edge 111 has a slope inclined downward to the left with respect to the axis L.

Here, the inclination of the downstream end edge 111 of the guide vane 110 will be defined as follows. That is, the inclination when the lower end portion 113 of the downstream end edge 111 of the guide vane 110 is delayed (displaced to the left) in the rotation direction R in the circumferential direction of the runner 4 in comparison with the upper end portion 112 is referred to as "positive inclination". Conversely, the inclination when the lower end portion 113 of the downstream end edge 111 of the guide vane 110 is advanced (displaced to the right) in the rotation direction R in the circumferential directions of the runner 4 in comparison with the upper end portion 112 is referred to as "negative inclinations". This means that, in the guide vane 110 according to the present embodiment, the downstream end edge 111 has the positive inclination. Note that the same applies to the upstream end edge 71 of the runner blades 7 to be described later for designating such inclination.

As illustrated in FIGS. 1 and 2, in the guide vane apparatus 100 according to the present embodiment, a first rotating shaft 133 is provided at the upper end of the guide vane 110 via a first flange 131. Further, a second rotating shaft 134 is provided at a lower end of the guide vane 110 via a second flange 132. In particular, as illustrated in FIGS. 1 and 2, the first rotating shaft 133 extends upward from the upper surface of the first flange 131, and the second rotating shaft 134 extends downward from the lower surface of the second flange 132. Both of the first rotating shaft 133 and the second rotating shaft 134 have central axes that coincide with the axis L.

Next, a Francis turbine 200 in which such the guide vane apparatus 100 is used will be described with reference to FIGS. 3 and 4.

Figure 3:
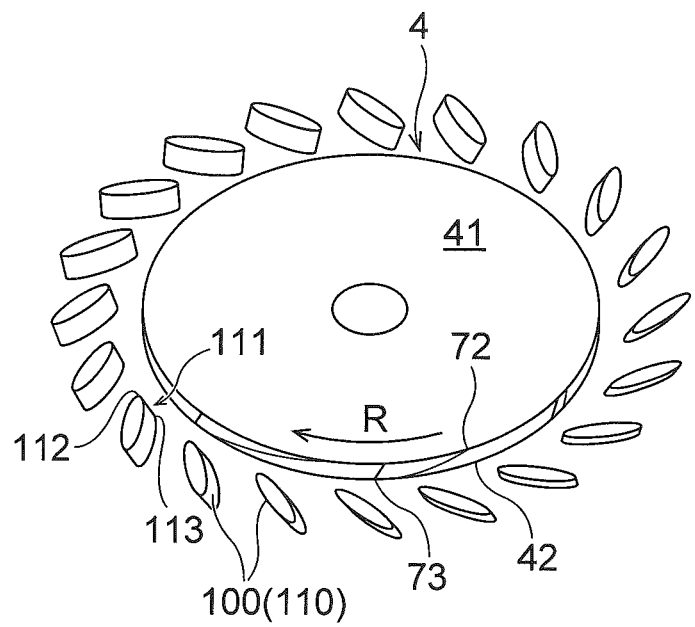
FIG. 3 is a schematic perspective view indicating a guide vane and a runner of a water turbine to which the guide vane apparatus of FIG. 1 is applied.

FIG. 3 is a schematic perspective view illustrating the guide vane apparatus 100 and the runner 4 of the Francis turbine 200 in which the guide vane apparatus 100 of FIG. 1 is used. FIG. 4 is a schematic top view of FIG. 3.

Figure 4:
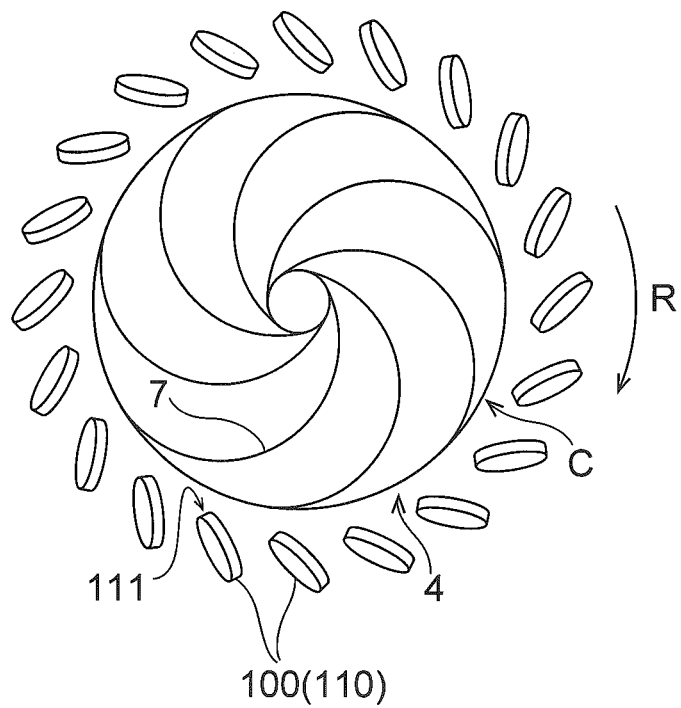
FIG. 4 is a schematic top view of FIG. 1.
Figure 10:
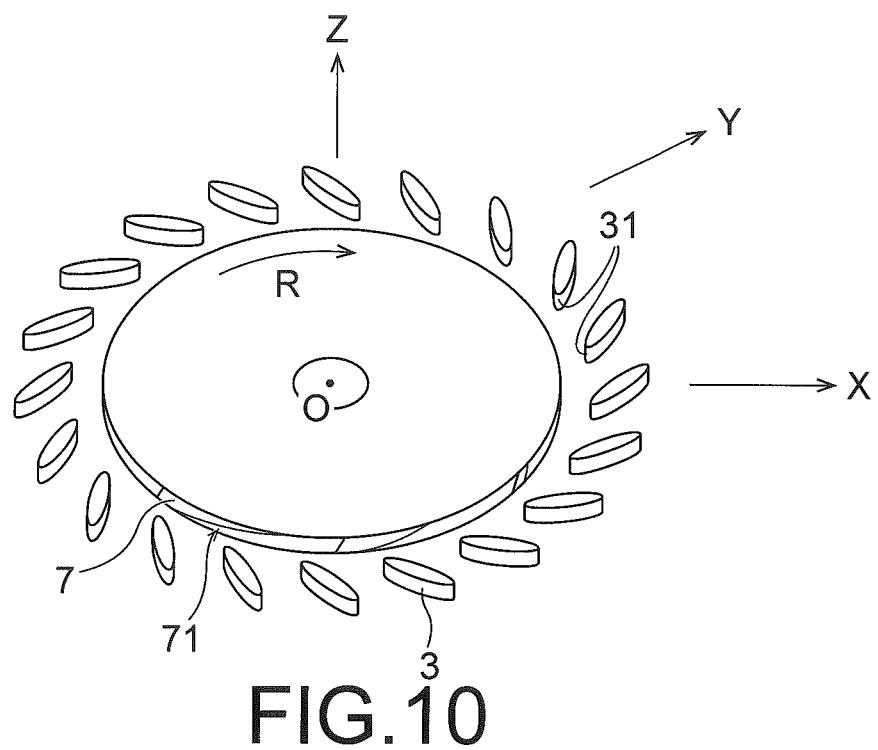
FIG. 10 is a schematic perspective view illustrating a guide vane and a runner of a Francis turbine in which a conventional guide vane apparatus is disposed.
Figure 11:
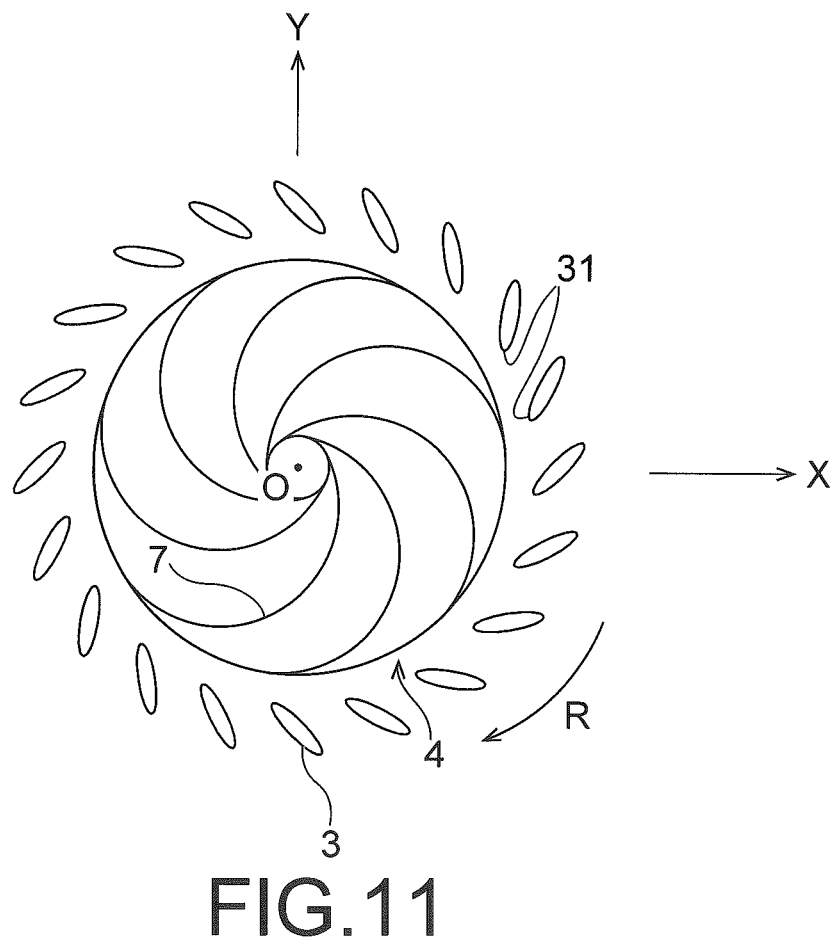
FIG. 11 is a schematic top view of FIG. 10.
Figure 12:
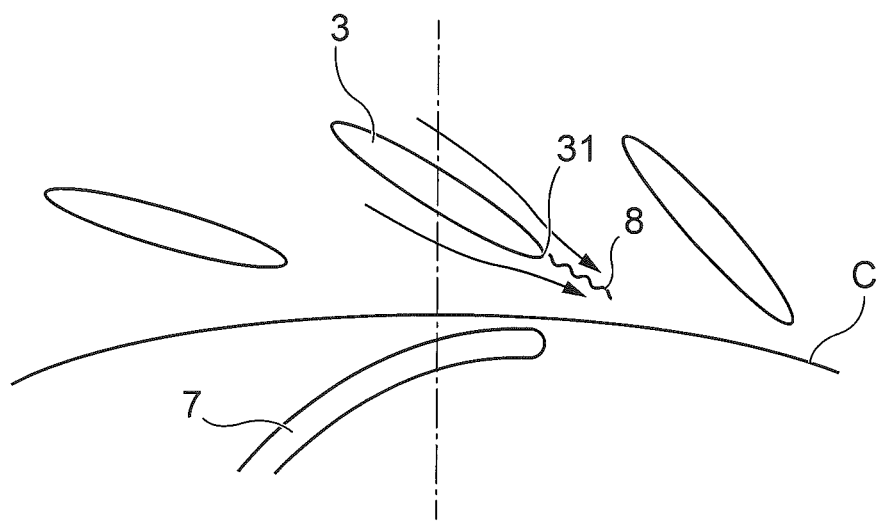
FIG. 12 is a partially enlarged view of FIG. 10 for explaining the cause of generation of hydraulic pulsation between a runner blade, and a guide vane.
Figure 13:
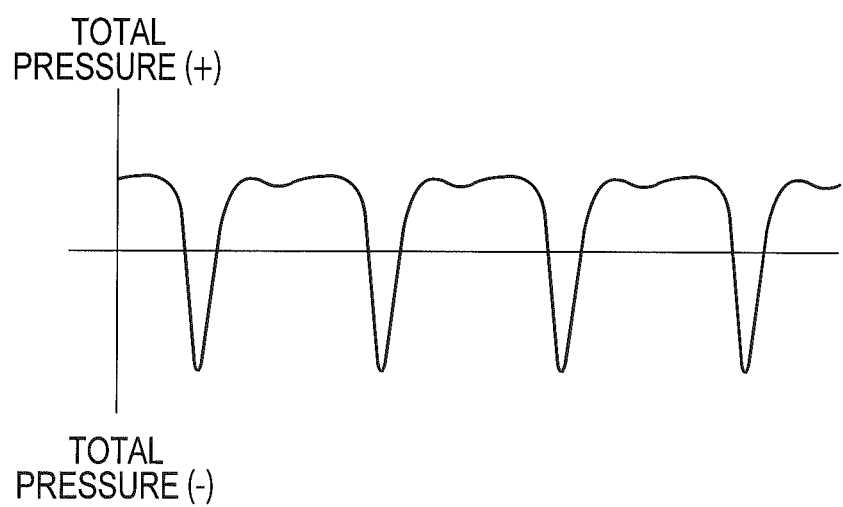
FIG. 13 is a diagram schematically illustrating the total pressure distribution in, the circumferential direction between a runner and a guide vane in a conventional Francis turbine.

As illustrated in FIGS. 3 and 4, instead of the guide vane 3 of the conventional Francis turbine 10 illustrated in FIGS. 10 and 11, the same number of guide vanes 110 according to the present embodiment are arranged at the same positions as the guide vanes 3. This means that in the existing Francis turbine 10, by exchanging to the guide vane 3 with the guide vane 110 according to the present embodiment, without replacing the entire apparatus of the Francis turbine 10, the effects described in the present embodiment can be obtained. However, it is not intended to limit to arrange the same number of the guide vanes as in the past. In FIGS. 3 and 4, to clearly indicate the inclination of the guide vane 110, illustration of the first and second flanges 131 and 132 and the first and second rotating shafts 133 and 134 is omitted.

As illustrated in FIGS. 3 and 4, the downstream end edge 111 of the guide vane 110 has a positive inclination. On the other hand, the upstream end edge 71 of the runner blade 7 has a negative inclination. Consequently, as illustrated in FIG. 3, the downstream end edge 111 of the guide vane 110 and the upstream end edge 71 of the runner blade 7 facing the downstream end edge 111 are disposed in an approximately "X" shape as viewed from the upstream side.

Next, the effects according to the embodiment will be described.

When the operation of the Francis turbine 10 is started, as described above, the back flow 8 is generated from the downstream end edge 111 of the guide vane 100, and this back flow 8 extends to the upstream end edge 71 of the runner blade 7 of the runner 4. Therefore, considering an imaginary cylindrical surface C which is concentric with the runner 4 and has the same outer diameter, the region where this imaginary cylindrical surface C intersects with the back flow 8 has a positive inclination as with the downstream end edge 111 of the guide vane 110. In other words, unlike the conventional Francis turbine 10, the back flow 8 over which the upstream end edge 71 of the runner blade 7 crosses has an inclination in a direction opposite to the inclination with respect to the Z axis of the upstream end edge 71 and reaches the runner 4.

Figure 5A:
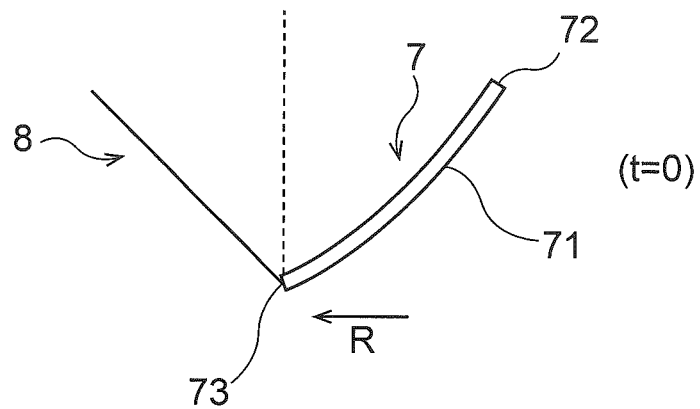
FIGS. 5A, 5B, and 5C are views for explaining how an upstream end edge of a runner blade crosses a back flow in a Francis turbine employing the guide vane apparatus illustrated in FIG. 1. In particular.
Figure 5B:
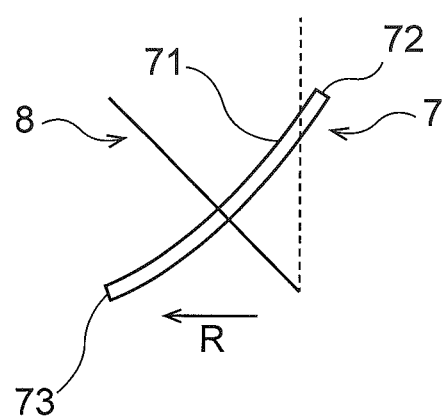
Figure 5C:
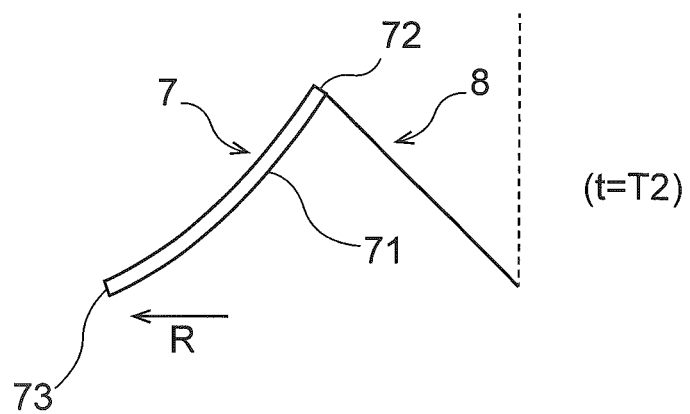

FIGS. 5A, 5B, and 5C are schematic views illustrating how the upstream end edge 71 of the runner blade 7 crosses the back flow 8 in the Francis turbine 200 employing the guide vane apparatus 100 according to the present embodiment. FIG. 5A is a view illustrating a state in which the lower end portion 73 of the upstream end edge 71 of the runner blade 7 crosses the back flow 8. FIG. 5B is a view illustrating a state in which the middle portion of the upstream end edge 71 of the runner blade 7 crosses the back flow 8. FIG. 5C is a view illustrating a state in which the upper end portion 72 of the upstream end edge 71 of the runner blade 7 crosses the back flow 8. The broken line in each drawing indicates the back flow generated by the conventional guide vane 3 such that the lower end thereof coincides with the lower end of the back flow 8 generated by the guide vane 110 according to the present embodiment.

As illustrated in FIGS. 5A, 5B, and 5C, since the back flow 8 generated from the downstream end edge 111 of the guide vane 110 has an inclination in a direction opposite to the inclination of the upstream end edge 71, if the flow rate of flowing water is the same, the time required for the upstream end edge 71 from starting crossing the back flow 8 to completing the crossing is longer than the time required for the upstream end edge 71 of the runner blade 7 to cross the back flow 8 in the conventional Francis turbine 10. That is, since the time width over which the upstream end edge 71 of the runner blade 7 passes through the low pressure region caused by the back flow is longer than in the past, fluctuation of the water pressure is alleviated, and the water pressure pulsation is reduced.

According to the present embodiment as described above, it is possible to provide the guide vane apparatus 100 capable of reducing hydraulic pulsation generated between the runner 4 and the guide vane 110. According to the guide vane apparatus 100, the stability of the Francis turbine 200 during operation can be enhanced, and furthermore, the life of equipment can be extended.

Furthermore, by forming the Francis turbine 200 employing the guide vane apparatus 100 according to the present embodiment, a Francis turbine 200 can be provided which is highly stable at the time of operation and can realize the long equipment life.

Next, a second embodiment of the present invention will be described.

Figure 6:
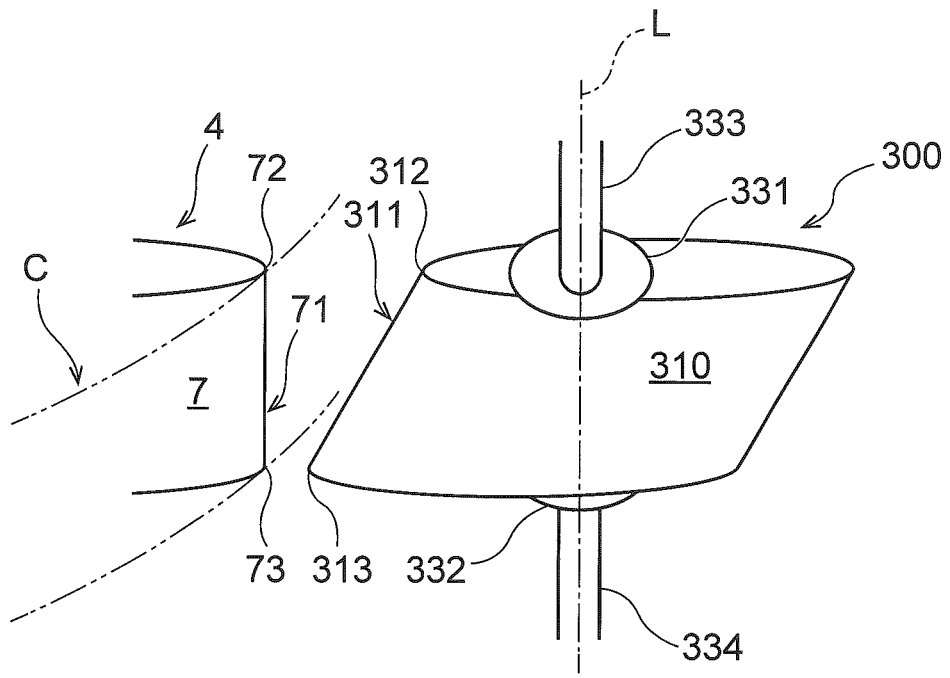
FIG. 6 is a schematic side view illustrating a guide vane apparatus according to a second embodiment of the present invention.

FIG. 6 is a schematic side view illustrating a guide vane apparatus 300 according to a second embodiment of the present invention.

As illustrated in FIG. 6, in the guide vane apparatus 300 according to the present embodiment, a lower end portion 313 of a downstream end edge 311 is displaced in a flow direction of flowing water with respect to an upper end portion 312 of the downstream end edge 311 as viewed from a pressure surface side of a guide vane 310 (as viewed from the front side in FIG. 6). Specifically, in the example indicated in FIG. 6, the lower end portion 313 of the downstream end edge 311 is displaced to the left with respect to the upper end portion 312 of the downstream end edge 311 as viewed from the front side in FIG. 6.

With such a configuration, in a water turbine in which the guide vane apparatus 300 according to the present embodiment is used, the distance between the downstream end edge 311 of the guide vane 310 and the runner 4 is gradually increased from the lower end portion 313 toward the upper end portion 312. Here, since the downstream end edge 311 of the guide vane 310 is formed linearly when viewed from the front side in FIG. 6, the distance linearly increases from the lower side to the upper side.

Other configurations, in particular, the fact that the downstream end edge 311 of the guide vane 310 has a positive inclination, is the same as the first embodiment. Therefore, in FIG. 6, components similar to those of the guide vane apparatus 100 according to the first embodiment are denoted by substantially the same reference signs, and a detailed description thereof will be omitted. In the water turbine in which the guide vane apparatus 300 according to the present embodiment is used, the upstream end edge 71 of the runner blade 7 of the runner 4 has a negative inclination as in the first embodiment. The distance between the downstream end edge 111 of the guide vane apparatus 100 and the upstream end edge 71 of the runner blade 7 in the first embodiment is the same as the distance between the lower end portion 313 of the downstream end edge 311 of the guide vane 310 and the lower end portion 73 of the upstream end edge 71 of the runner blade 7.

The operation of the guide vane apparatus 300 as described above is as follows. That is, when the operation of a Francis turbine is started, as described above, the back flow 8 is generated from the downstream end edge 311 of the guide vane 310. The back flow 8 has a certain width in the extending direction of the downstream end edge 311 of the guide vane 310 and flows downstream. Therefore, considering an imaginary cylindrical surface C which is concentric with the runner 4 and has the same outer diameter as the runner 4, the region where this imaginary cylindrical surface C intersects with the back flow 8 has a positive inclination as with the downstream end edge 311 of the guide vane 310. That is, the back flow 8 reaching the imaginary cylindrical surface C has an inclination in a direction opposite to the inclination of the upstream end edge 71 of the runner blade 7 (refer to FIGS. 5A, 5B, and 5C) as in the first embodiment.

However, in the present embodiment, the distance between the downstream end edge 311 of the guide vane 310 and the runner 4 linearly increases from the lower side to the upper side. For this reason, unlike the first embodiment, the degree of attenuation linearly increases from the lower side to the upper side of the back flow 8 reaching the imaginary cylindrical surface C. That is, the back flow 8 reaching the imaginary cylindrical surface C has a relatively lower pressure drop by the back flow 8 than the back flow 8 reaching the imaginary cylindrical surface C in the first embodiment, except for its lower end portion. The process in which the upstream end edge 71 of the runner blade 7 crosses the back flow 8 is as indicated in FIGS. 5A, 5B, and 5C, and is the same as in the first embodiment.

From the above, hydraulic pulsation is further reduced in a water turbine employing the guide vane apparatus 300 according to the present embodiment.

In the present embodiment, the distance between the downstream end edge 311 of the guide vane 310 and the runner 4 linearly increases from the lower side to the upper side, but it is not limited in this embodiment. For example, in a variation of this embodiment, the above-described distance may increase nonlinearly from the lower side to the upper side or decrease linearly or nonlinearly from the lower side to the upper side. Even in the water turbines employing the guide vane apparatus according to the variations, the hydraulic pulsation is effectively reduced.

Figure 7:
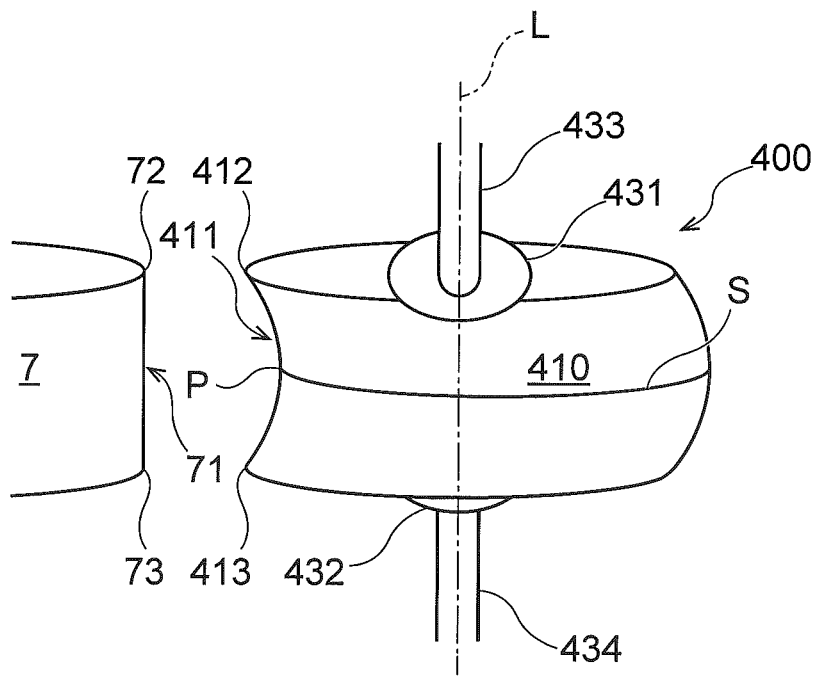
FIG. 7 is a schematic side view illustrating a guide vane apparatus according to a variation of FIG. 6.

Further, FIG. 7 is a schematic side view illustrating a guide vane apparatus 400 according to a further variation of FIG. 6. As illustrated in FIG. 7, the distance between the downstream end edge 411 of the guide vane apparatus 400 and the runner 4 may be increased in the middle region between a lower end portion 413 and an upper end portion 412 of the downstream end edge 411. In FIG. 7, since the central cross section S of the guide vane 410 protrudes in the most upstream side, the distance between the region P where the central cross section S and the downstream end edge 411 cross each other and the upstream end edge 71 of the runner blade 7 becomes maximum. The other configuration is the same as the guide vane apparatus 100 according to the first embodiment including the fact that the downstream end edge 411 of the guide vane 410 has a positive inclination. Therefore, in FIG. 7, the components corresponding to the guide vane apparatus 100 are denoted by the same reference signs, and a detailed description thereof will be omitted here.

Even in a water turbine employing the guide vane apparatus 400 according to such a variation, hydraulic pulsation can be effectively reduced similarly to the second embodiment.

Next, a guide vane apparatus 500 according to a third embodiment of the present invention will be described.

Figure 8:
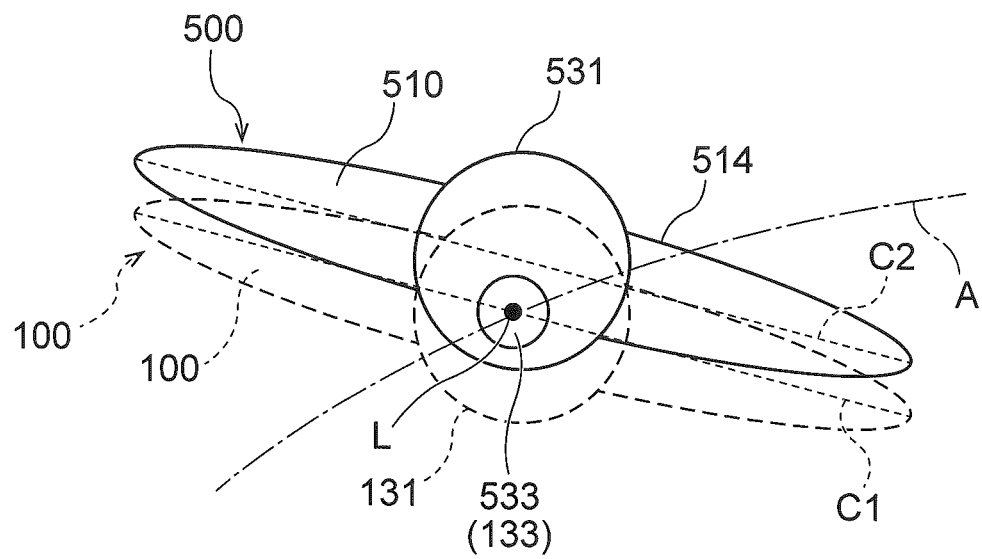
FIG. 8 is a schematic plan view illustrating a guide vane apparatus according to a third embodiment of the present invention.

FIG. 8 is a schematic plan view illustrating the guide vane apparatus 500 according to a third embodiment of the present invention. In FIG. 8, the solid lines indicate the guide vane apparatus 500 according to the present embodiment, and the broken lines indicate the guide vane 100 according to the first embodiment for comparison. However, each of the guide vanes 110 and 510 is indicated by a contour line at the center position (central cross section) in the vertical direction (depth direction of the page).

As illustrated in FIG. 8, in the guide vane apparatus 500 according to the present embodiment, the axis L of the rotating shaft 533 for rotating the guide vane 510 coincides with the axis L of the rotating shafts 133 and 134 of the guide vane apparatus 100 according to the first embodiment. On the other hand, in the guide vane apparatus 500 according to the present embodiment, a camber line C2 of the guide vane 510 is located on the pressure surface 514 side of the guide vane 510 with respect to the axis L. In the water turbine using such the guide vane apparatus 500, the guide vane apparatus 500 positions the guide vane 510 as a whole on the side of the casing 1 while maintaining the position of the axis L of the rotating shaft 533 at the conventional position. That is, in such a water turbine, the distance between the downstream end edge 511 of the guide vane 510 and the upstream end edge 71 of the runner blade 7 is increased more than before, while maintaining the guide vane pitch circle A at the conventional position.

In such a water turbine, when water flows into the guide vane apparatus 500, as described above, the back flow 8 is generated from the downstream end edge 511 of the guide vane 510, but this back flow 8 is weaker than the conventional one and reaches the upstream end edge 71 of the runner blade 7.

Therefore, if the upstream end edge 71 of the runner blade 7 has a negative inclination, in conjunction with the fact that the downstream end edge 511 of the guide vane 510 has a positive inclination, in the water turbine employing the guide vane apparatus 500 according to the present embodiment, the hydraulic pulsation can be further reduced as compared with the conventional one.

In the above description, the upstream end edge 71 of the runner blade 7 has been explained as having a negative inclination. On the contrary, it may have a positive inclination. In this case, the guide vane apparatus may be configured such that the downstream end edge of the guide vane has a negative inclination.

In the example indicated in FIG. 3, the downstream end edge 111 of the guide vane 110 extends substantially linearly as viewed from the downstream side, but the present invention is not limited to such a form. That is, in the guide vane according to another embodiment, a downstream end edge may include such as a C-shaped or S-shaped curve when viewed from the downstream side. Furthermore, at least a part of the downstream end edge 111 of the guide vane 110 may be curved as viewed from the pressure surface side. These are applicable to all the embodiments and variations described in this specification.

Figure 14:
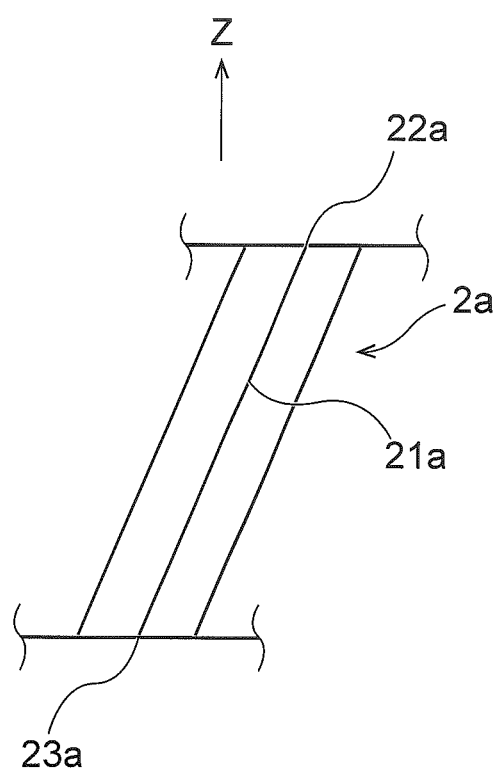
FIG. 14 is a schematic rear view illustrating a stay vane that can be used in a water turbine according, to the present embodiment.

Furthermore, to further enhance the effect of reducing the hydraulic pulsation according to each of the embodiments and the variations described above, it is also effective to configure the stay vane 2a disposed on the upstream side of the guide vane as illustrated in FIG. 14.

FIG. 14 is a schematic rear view illustrating a stay vane 2a that can be used in a water turbine according to the present embodiment. The stay vane 2a has a downstream end edge 21a having an upper end portion 22a and a lower end portion 23a. As illustrated in FIG. 14, the lower end portion 23a of the downstream end edge 21a is displaced in the direction orthogonal to the Z axis with respect to the upper end portion 22a of the downstream end edge 21a as viewed from the downstream side (the front side in FIG. 14). In particular, in the example indicated in FIG. 14, the lower end portion 23*a* of the downstream end edge 21*a* is displaced to the left with respect to the upper end portion 22*a* of the downstream end edge 21*a* when viewed from the downstream side. As a result, the downstream end edge 21*a* has an inclination (positive inclination) to the lower left with respect to the Z axis.

In the guide vane disposed downstream of the stay vane 2*a*, when the downstream end edge thereof has a positive inclination (refer to FIG. 2), water flowing into the guide vane has the same inclination as the guide vane from the beginning. In this case, the effect of rectification by the guide vane is further enhanced as compared with the case where a conventional stay vane having a downstream end edge parallel to the Z axis is provided. Thus, it is possible to suppress the occurrence of the back flow 8, and it is possible to further reduce the occurrence of the hydraulic pulsation in the water turbine employing the guide vane apparatus according to the present embodiments and variations.

Such an effect can be obtained by configuring the inclination of the downstream end edge of the stay vane in the same direction as the inclination of the downstream end edge of the guide vane. Therefore, when the downstream end edge of the guide vane has a negative inclination, the stay vane may be configured such that the downstream end edge thereof has a negative inclination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A guide vane apparatus for a water turbine which is rotatable around an axis, comprising:
a guide vane configured to direct supplied flowing water toward a downstream side,
wherein the guide vane has a downstream end edge having an upper end portion and a lower end portion, the lower end portion of the downstream end edge is displaced in a direction orthogonal to the axis with respect to the upper end portion of the downstream end edge when viewed from the downstream side, and the downstream end edge comprises one of a C-shape, or an S-shape.

2. The guide vane apparatus according to claim 1, wherein a first rotating shaft is provided at an upper end of the guide vane via a first flange, a second rotating shaft is provided at a lower end of the guide vane via a second flange, and the central axes of the first rotating shaft and the second rotating shaft coincide with the axis.

3. The guide vane apparatus according to claim 1, wherein at least a part of the downstream end edge of the guide vane is curved when viewed from the downstream side.

4. The guide vane apparatus according to claim 1, wherein the lower end portion of the downstream end edge of the guide vane is displaced in a flowing direction of the flowing water with respect to the upper end portion of the downstream end edge when viewed from a pressure surface side of the guide vane.

5. The guide vane apparatus according to claim 1, wherein the downstream end edge of the guide vane protrudes on the downstream side in a region located between the upper end portion and the lower end portion of the downstream end edge as viewed from a pressure surface side of the guide vane.

6. The guide vane apparatus according to claim 1, wherein a camber line of the guide vane is located on a pressure surface side of the guide vane with respect to the axis.

7. A water turbine, comprising:
a casing;
a runner rotationally driven by flowing water supplied through the casing; and
the guide vane apparatus according to claim 1 disposed between the runner and the casing.

8. The water turbine, according to claim 7, further comprising:
a stay vane provided on an outer peripheral side of the guide vane,
wherein the stay vane includes a downstream end edge having an upper end portion and a lower end portion,
the lower end portion of the downstream end edge of the stay vane is displaced with respect to the upper end portion of the downstream end edge of the stay vane when viewed from the downstream side in the same direction as the displacement of the lower end portion of the downstream end edge of the guide vane with respect to the upper end portion of the downstream end edge of the guide vane.

9. A water turbine, comprising:
a runner which is rotationally driven; and
a guide vane disposed on an outer peripheral side of the runner,
wherein the runner has runner blades,
the runner blade includes an upstream end edge having an upper end portion and a lower end portion,
the lower end portion of the upstream end edge is displaced with respect to the upper end portion of the upstream end edge in one of two circumferential directions of the runner,
the guide vane includes a downstream end edge having an upper end portion and a lower end portion, and
the lower end portion of the downstream end edge is displaced with respect to the upper end portion of the downstream end edge in the other of two circumferential directions of the runner, and the downstream end edge comprises one of a C-shape, or an S-shape.

10. A water turbine, according to claim 9, further comprising:
a stay vane provided on an outer peripheral side of the guide vane,
wherein the stay vane includes a downstream end edge having an upper end portion and a lower end portion,
the lower end portion of the downstream end edge of the stay vane is displaced with respect to the upper end portion of the downstream end edge of the stay vane when viewed from the downstream side in the same direction as the displacement of the lower end portion of the downstream end edge of the guide vane with respect to the upper end portion of the downstream end edge of the guide vane.

* * * * *